Nov. 4, 1947.　　　D. W. EPSTEIN　　　2,430,283
RADIO DISTANCE AND DIRECTION RECORDER
Filed April 13, 1945　　2 Sheets-Sheet 1
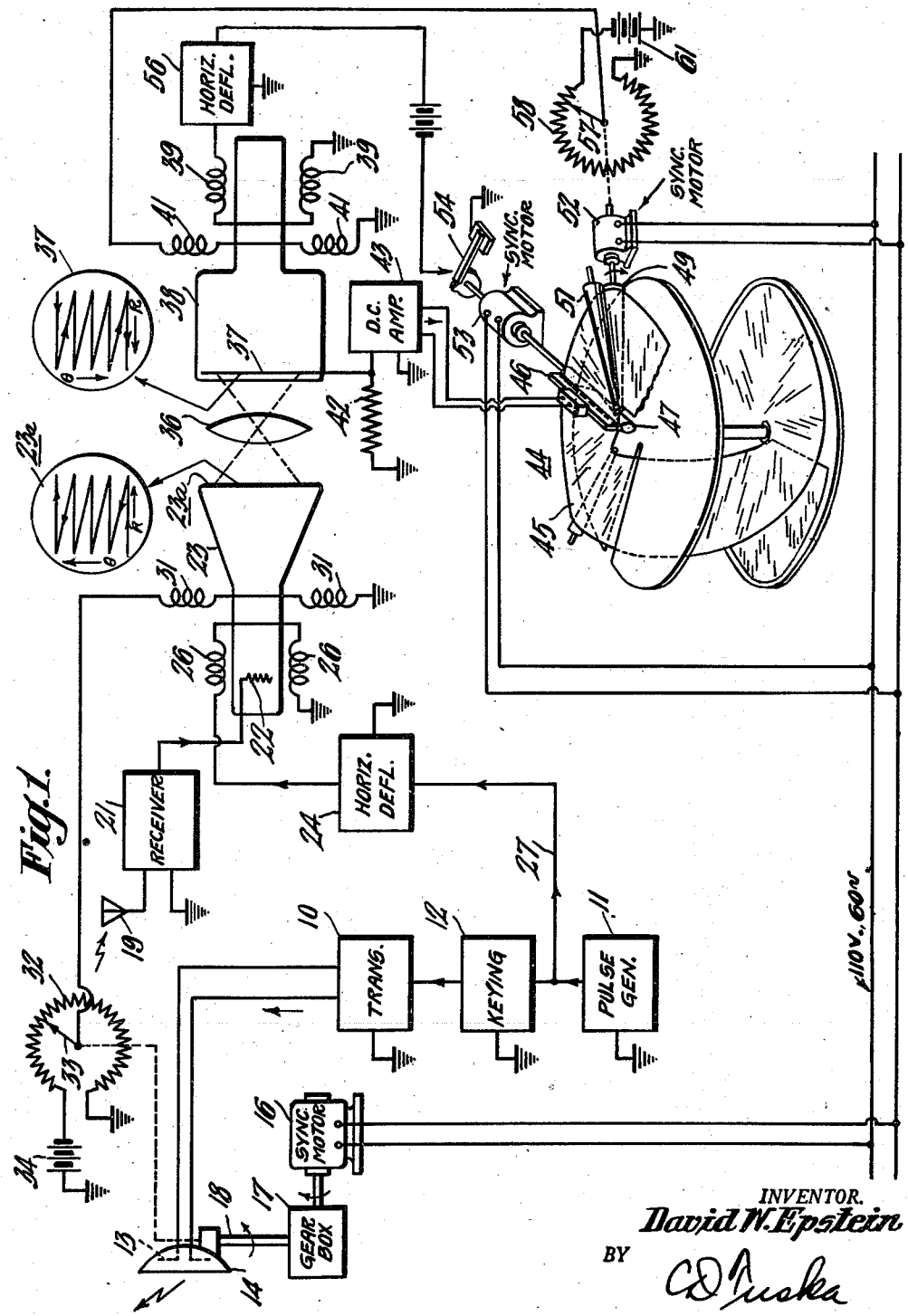
INVENTOR.
David W. Epstein
BY
ATTORNEY

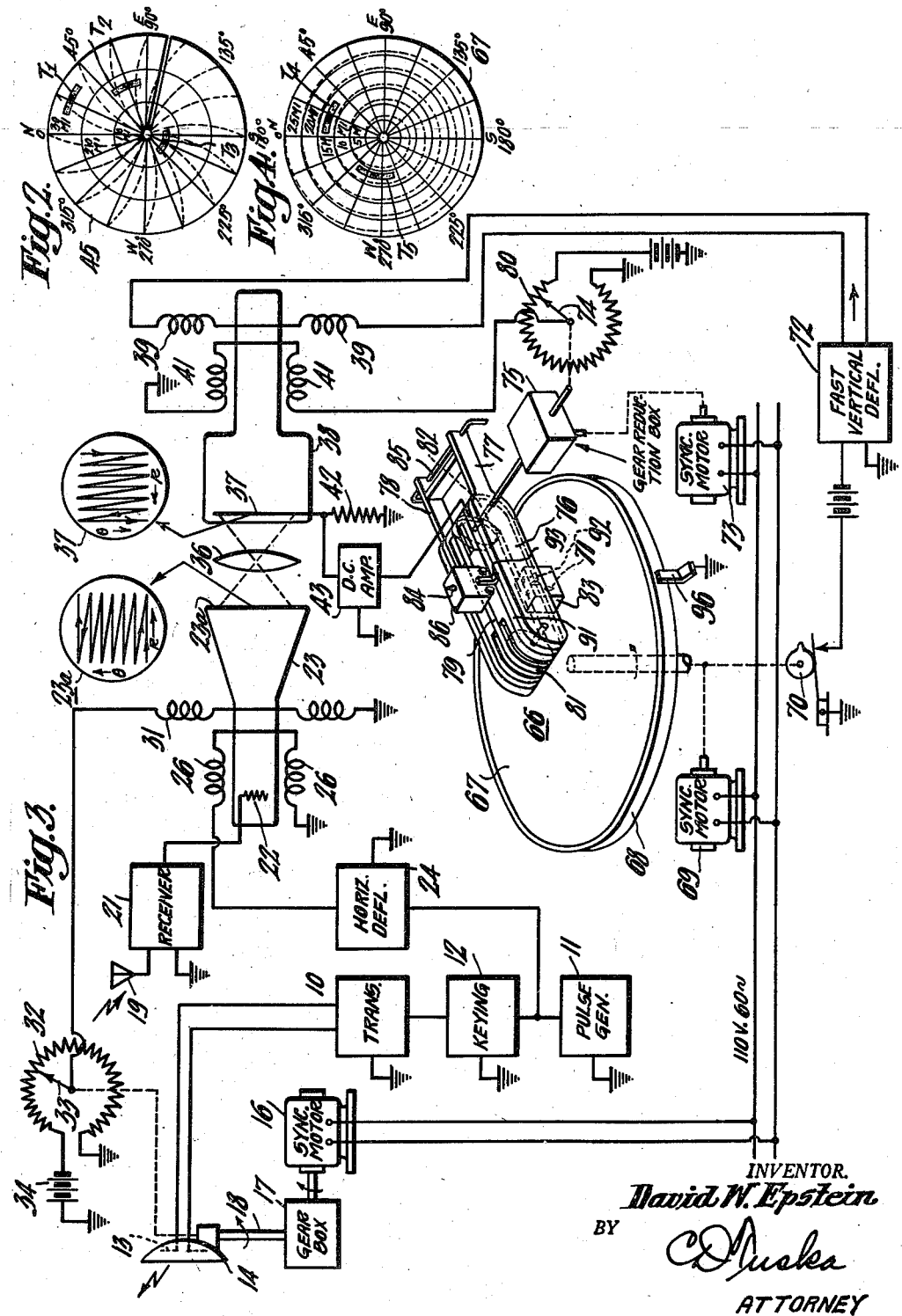

Patented Nov. 4, 1947

2,430,283

UNITED STATES PATENT OFFICE 2,430,283

RADIO DISTANCE AND DIRECTION RECORDER

David W. Epstein, Princeton, N. J., assignor to Radio Corporation of America, a corporation of Delaware Application April 13, 1945, Serial No. 588,231

6 Claims. (Cl. 250—1.62)

The present invention relates to radar systems and particularly to systems of the "plan-position-indicator" or P. P. I. type wherein the signals reflected from aircraft or other targets are recorded.

An object of the invention is to provide an improved pulse-echo radar system wherein the received information is recorded in polar co-ordinates.

A further object of the invention is to provide an improved method of and means for recording in polar co-ordinates the reflected signals or target information supplied by a radar system of the P. P. I. type.

In practicing one embodiment of the invention, the reflected radio pulses are supplied from the P. P. I. receiver to a cathode ray indicator tube wherein the cathode ray is deflected horizontally in synchronism with the radio pulse transmission and is deflected vertically in synchronism with the rotation of the directive transmitter antenna. Upon the reception of a pulse the cathode ray intensity is increased to produce a spot on the cathode-ray tube screen. Thus a pattern is obtained on the screen in rectangular co-ordinates which contains the desired information as to the azimuth of and the distance to an enemy aircraft or other reflecting target.

In order to obtain a record that has the same general appearance as the pattern of the usual P. P. I. indicator tube, i. e., a pattern in polar co-ordinates, the above-described rectangular pattern is projected upon the screen of a cathode ray storage tube so that signals may be taken off it at a slow scanning rate and used to operate a recorder designed to record in polar co-ordinates. In effect, this recorder rotates a disc of paper in synchronism with the storage tube deflection corresponding to the rotation of the P. P. I. antenna while a stylus is moved radially outward from the center of the disc in synchronism with the storage tube deflection corresponding to the pulse repetition rate. Thus, the angular position of a recorded spot representing a target corresponds to the azimuth of the target while the radial distance from the center of the paper disc corresponds to the distance of the target from the P. P. I. system.

The invention will be better understood from the following description taken in connection with the accompanying drawing in which, Figure 1 shows one embodiment of the invention applied to a radar system of the P. P. I. type which is illustrated by a block diagram, Figure 2 is a view showing the type of record that is obtained by employing the system of Fig. 1, Figure 3 shows another embodiment of the invention as applied to a P. P. I. radar system, and Figure 4 is a view showing the type of record that is obtained by employing the system of Fig. 3.

In the several figures, similar parts are indicated by similar reference characters.

Figure 1 shows a pulse-echo system of the P. P. I. type comprising a radio pulse transmitter 10 that is modulated by short electrical pulses produced by a pulse generator 11 and applied to the transmitter through a keying or modulating circuit 12. The resulting periodic radio pulses are radiated from a directive antenna 13 which may be a dipole mounted in a parabolic reflector 14.

The antenna 13, in the present example, is rotated continuously through 360 degrees to search for approaching enemy aircraft or other targets. A synchronous motor 16 rotates the antenna 13 through a gear box 17 having a vertical shaft 18 upon which the antenna is supported.

The transmitted pulses, after reflection from a target, are picked up by a receiver antenna 19 and amplified and demodulated in a radio receiver 21. The receiver output pulses are applied to the control grid 22 of a cathode ray tube 23 which may be of a conventional design having a phosphorescent screen at its large end 23a.

The cathode ray is deflected horizontally at a rapid rate in synchronism with the radio pulse transmission by means of a horizontal deflecting circuit 24 and a pair of deflecting coils 26. The saw-tooth waves produced by the deflecting circuit 24 are synchronized with the transmitted pulses by means of pulses from the generator 11 supplied over a conductor 27.

The cathode ray is simultaneously deflected vertically at a slow rate in synchronism with the rotation of the antenna 13. This is done by supplying to a pair of vertical deflecting coils 31 a sawtooth current that is obtained from a potentiometer which comprises a resistor 32 and a rotatable arm 33 that is coupled to the antenna support shaft 18. A battery 34 is connected across the potentiometer resistor 32.

Thus there is produced on the screen of the cathode-ray tube 23 a scanning pattern as illustrated at 23a whereby a bright spot appearing on the screen will indicate the position of an approaching aircraft. This position information is given in rectangular or Cartesian co-ordinates, the abscissa representing distance to the target, and the ordinate representing the target's azimuth or angular position.

In order to obtain a record in polar co-ordinates, the view appearing on the screen of tube 23 is projected by means of a lens system, indicated at 36, upon the storage screen 37 of a cathode ray storage tube 38 such as an Orthicon. The screen 37 is scanned comparatively rapidly in the horizontal direction by deflecting coils 39 and comparatively slowly in the vertical direction by deflecting coils 41 to produce the scanning pattern indicated. The resulting output signal which corresponds to the view projected upon the screen 37 is taken off an output resistor 42 and supplied through a direct-current amplifier 43 to a recorder 44 which may be either of the carbon paper type or of the electrolytic type. In the drawing it is assumed that the recorder is of the carbon paper type but the carbon paper and feed therefor have been omitted to simplify the drawing.

This signal from amplifier 43 actuates a printer bar 46 which is positioned adjacent to a scanning drum 47. The drum 47 has the usual helical edge thereon which moves the length of the printer bar 46 for each rotation of the scanning drum 47.

A helix of recording paper 45 is pulled past the printer bar 46 by means of a conical roller 49 and a similar idler roller 51. The roller 49 is driven by a synchronous motor 52 at a rate that pulls the paper 45 past the printer bar 46 at a comparatively slow speed. Meanwhile, the scanning drum 47 is driven by a synchronous motor 53 at a rate that scans the paper 45 radially at a comparatively high speed.

The horizontal deflection of the storage tube 38 is made synchronous with the radial scanning of the paper 45 by means of a cam operated switch 54 that applies a synchronizing pulse to a horizontal sawtooth generator or deflecting circuit 56 at the end of each radial scan of the paper.

The vertical deflection of the storage tube 38 is made synchronous with the movement of the paper 45 past the printer bar 46 by rotating the arm 57 of a potentiometer resistor 58 in synchronism with the feed roller 49. A battery 61 is connected across the resistor 58 whereby a sawtooth current is supplied to the vertical deflecting coils 41 as the potentiometer arm 57 is rotated.

The helix of paper 45 is, in effect, a plurality of paper discs cut radially and with the edge of one disc attached to the edge of the next disc. This, in fact, is one way of making the helix of paper. Also, it will be noted that pulling the paper 45 past the scanning bar by the feed roller 49 is the same as rotating one of the paper disc elements of the paper helix. This rotation of the paper disc element is at the rate of one rotation for each vertical deflection of the storage tube electron beam.

The resulting record is of the character shown in Fig. 2 where the presence of three airplanes is recorded at T1, T2 and T3. Each paper disc element preferably has marked on it a scale of distance by means of concentric circles and also a scale of azimuth or angle by means of straight radial lines. The dotted radial lines show the curvature in the radial scanning due to the movement of the paper during a radial scan. It will be understood that these scanning lines are close together, only a few of the scanning lines being represented on the drawing.

Fig. 3 shows the invention applied to a system wherein spiral scanning is employed for the recorder shown at 66 which, in this example, is assumed to be of the electrolytic type. In this embodiment, a paper disc 67 is rotated rapidly by a turn table 68 coupled to a synchronous motor 69. The turn table rotation and the vertical deflection of the storage tube 38 are synchronized by means of a cam operated switch 70 that applies a synchronizing pulse to the vertical deflecting sawtooth generator 72 once for each rotation of the turn table 68.

At the same time, a recording stylus (stylus 71, for example) is moved radially with respect to the turn table at a comparatively slow rate by means of a synchronous motor 73 and a driving mechanism described hereinafter. The stylus movement and the horizontal deflection of the storage tube are synchronized by means of mechanical coupling between the motor 73 and the arm 74 of a potentiometer resistor 80 which supplies sawtooth current to the deflecting coils 41 as the arm 74 is rotated.

Thus each fast vertical sweep of the storage tube cathode ray sweeps across the storage screen 37 on a line representing a certain range or target distance, and during each such sweep the paper disc 67 makes one rotation with the stylus at a radial position corresponding to range. Therefore, if there is a target in the range corresponding to one of said vertical sweeps, a mark will be made on the paper at a radial distance from its center corresponding to the range. Also, the mark will be made at an angular position on the paper corresponding to the azimuth of the target. A record of this character is shown in Fig. 4 where two targets T4 and T5 are recorded. It will be understood that the view or pattern on the cathode-ray tube screen end 23a is the same as described in connection with Fig. 1. Also, it will be understood that the scanning lines represented by the dotted spiral are close together rather than widely spaced, a spiral of widely spaced scanning lines being shown in Fig. 4 to simplify the drawing.

The mechanism by means of which the stylus 71 is moved radially with respect to the turn table 68 may be constructed in various ways. The mechanism which is shown by way of example comprises an arm or member 76 of insulating material having lugs 77 and 78 which are pivotally mounted on a supporting bar 85. The block 76 has a chain or belt 79 thereon which passes over an idler pulley 81 mounted in one end of the block 76 and which passes over a driving sprocket wheel or pulley 82 mounted in the other end of the block 76. The driving wheel or pulley 82 is coupled through a gear reduction unit 75 to the motor 73. The stylus carrier 83 for the stylus 71 is attached to the belt 79 so that the moving belt moves the carrier 83 radially with respect to the turn table 68.

Since the stylus 71 is moved so slowly that it may take a minute or more for it to move from the center of the turn table 68 to its periphery, it may be advantageous to attach a second stylus carrier 86 for a stylus 84 to the belt 79 so that the stylus 84 moves into position to begin recording from the center of the record when the stylus 71 reaches the periphery of the record. At this time an operator may lift the arm 76, remove the paper record disc 67 and replace it by a new record disc. In this way very little recording time is lost.

The storage tube signal current may be supplied to the styli 71 and 84 through a metal "collector ring" strip 91 with which brushes 92 and 93 on the stylus carriers 83 and 86 make contact, and through ground to a brush 96 in contact with the turn table 68 which is made of a conducting material.

From the foregoing, it will be seen that I have provided a simple way of obtaining records in polar co-ordinates of the reflecting objects or targets located by a P. P. I. radar system or the like whereby the records may be easily interpreted since they are a true pictorial representation or map of the location of the objects or targets with reference to the P. P. I. system.

I claim as my invention:

1. A radio locator system comprising means for radiating a radio signal and means for receiving the signal after reflection from a reflecting surface or target in the path of said radiated signal, at least one of said means comprising an antenna having a directive radiation pattern, means for changing the direction of the radiation pattern of said antenna successively through a predetermined angle, a cathode-ray storage tube having a storage screen, means for storing reflected target signals on said screen in rectangular co-ordinates representative of target range and target azimuth, means for scanning said storage screen in rectangular co-ordinates by a cathode ray which is deflected at a certain rate along the co-ordinate representative of azimuth and at a different rate along the co-ordinate representative of range, a recorder comprising means for rotating a recording paper disc element in synchronism with said deflection along the azimuth co-ordinate, means for moving a recording contact point radially with respect to said disc element in synchronism with said deflection along said range co-ordinate, means including said cathode ray scanning means for taking off said storage screen an output signal representative of the target signals stored thereon, and means for applying said output signal to said recorder for marking said recording paper at the recording contact point in response to said output signal reaching a value representative of a target signal.

2. A radio locator system comprising means for radiating a radio signal and means for receiving the signal after reflection from a reflecting surface or target in the path of said radiated signal, at least one of said means comprising an antenna having a directive radiation pattern, means for changing the direction of the radiation pattern of said antenna successively through a predetermined angle, a cathode-ray storage tube having a storage screen, means for storing reflected target signals on said screen in rectangular co-ordinates representative of target range and target azimuth, means for deflecting a cathode ray across said storage screen comparatively slowly along the co-ordinate representative of azimuth and comparatively rapidly along the co-ordinate representative of range, a recorder comprising means for rotating a recording paper disc element in synchronism with said slow deflection along the azimuth co-ordinate, means for moving a recording contact point radially with respect to said disc element in synchronism with said fast deflection along said range co-ordinate, means including said two deflecting means for taking off said storage screen an output signal representative of the target signals stored thereon, and means for applying said output signal to said recorder for marking said recording paper at the recording contact point in response to said output signal reaching a value representative of a target signal.

3. A radio locator system comprising means for radiating a radio signal and means for receiving the signal after reflection from a reflecting surface or target in the path of said radiated signal, at least one of said means comprising an antenna having a directive radiation pattern, means for changing the direction of the radiation pattern of said antenna successively through a predetermined angle, a cathode-ray storage tube having a storage screen, means for storing reflected target signals on said screen in rectangular co-ordinates representative of target range and target azimuth, means for scanning said storage screen in rectangular co-ordinates by a cathode ray which is deflected at a slow rate along the co-ordinate representative of azimuth and at a fast rate along the co-ordinate representative of range, a recorder comprising means for rotating a recording paper disc element in synchronism with said slow deflection along the azimuth co-ordinate, means including a scanning drum and a printer bar for moving a recording contact point radially with respect to said disc element in synchronism with said fast deflection along said range co-ordinate, means including said cathode ray scanning means for taking off said storage screen an output signal representative of the target signals stored thereon, and means for applying said output signal to said recorder for marking said recording paper at the recording contact point in response to said output signal reaching a value representative of a target signal.

4. The invention according to claim 3 wherein means is provided for feeding a spiral of recording paper between said scanning drum and printer bar.

5. A radio locator system comprising means for radiating a radio signal and means for receiving the signal after reflection from a reflecting surface or target in the path of said radiated signal, at least one of said means comprising an antenna having a directive radiation pattern, means for changing the direction of the radiation pattern of said antenna successively through a predetermined angle, a cathode-ray storage tube having a storage screen, means for storing reflected target signals on said screen in rectangular co-ordinates representative of target range and target azimuth, means for deflecting a cathode ray across said storage screen comparatively rapidly along the co-ordinate representative of azimuth and comparatively slowly along the co-ordinate representative of range, a recorder comprising means for rotating a recording paper disc element rapidly in synchronism with said fast deflection along the azimuth co-ordinate, means for moving a recording contact point radially with respect to said disc element in synchronism with said slow deflection along said range co-ordinate, means including said two deflecting means for taking off said storage screen an output signal representative of the target signals stored thereon, and means for applying said output signal to said recorder for marking said recording paper at the recording contact point in response to said output signal reaching a value representative of a target signal.

6. The invention according to claim 5 wherein said recorder includes two styli for making successively said recording contact point, said recorder including means for moving one of said styli into recording position immediately after the other of said styli has completed a radial traverse of said paper disc element.

DAVID W. EPSTEIN.

REFERENCES CITED

The following references are of record in the file of this patent:

FOREIGN PATENTS

| Number | Country | Date |
|--------|---------|------|
| 812,975 | France | Feb. 15, 1937 |
| 813,404 | France | Feb. 22, 1937 |
| 108,556 | Australia | Sept. 14, 1939 |